May 24, 1960
C. E. DANFORTH
2,937,849
STRUCTURAL DAMPENER FOR TURBO-BLADING
Filed Oct. 6, 1955
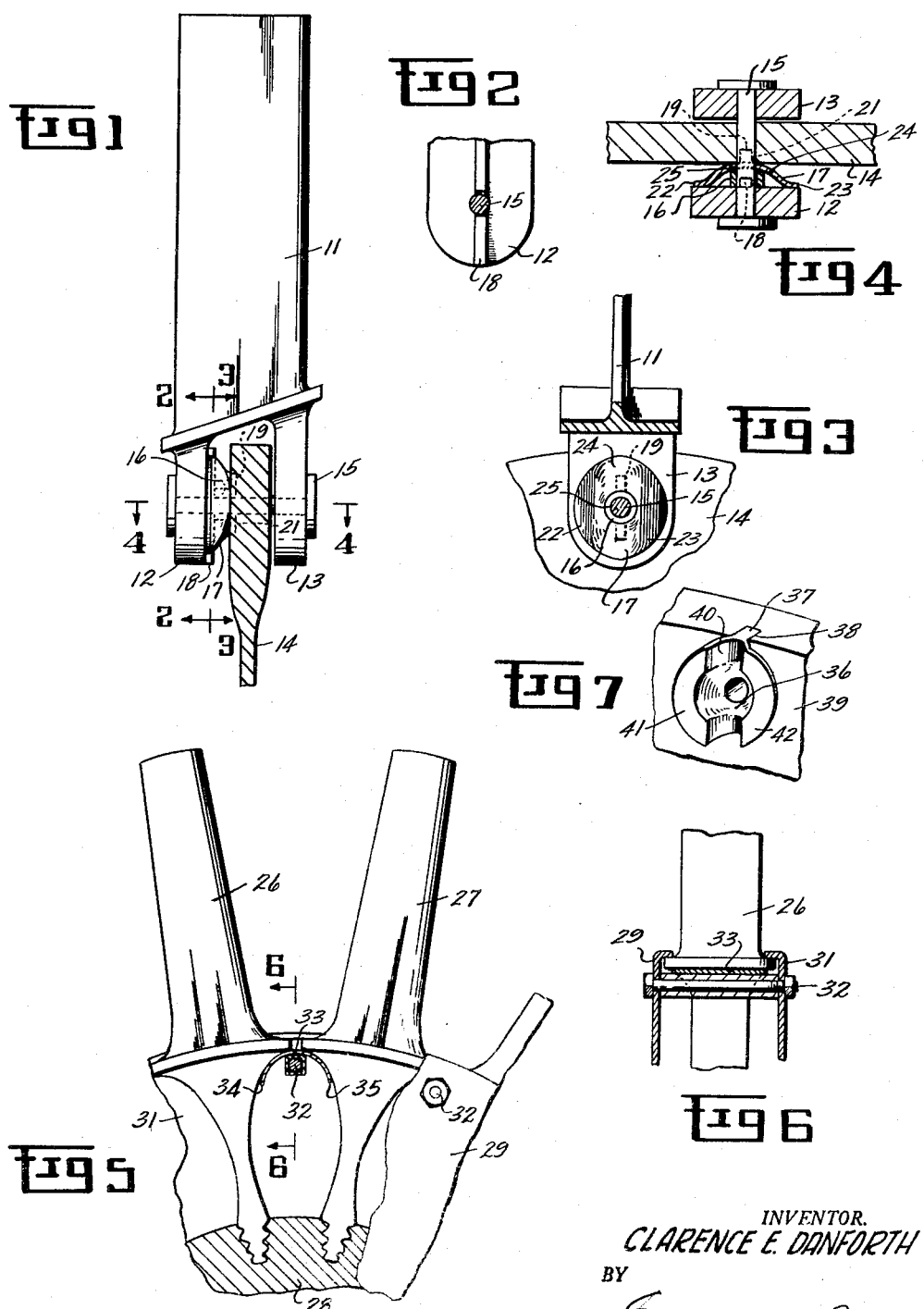
INVENTOR.
CLARENCE E. DANFORTH
BY
Edward M. Tittle
HIS ATTORNEY

United States Patent Office 2,937,849
Patented May 24, 1960

2,937,849

STRUCTURAL DAMPENER FOR TURBO-BLADING

Clarence E. Danforth, Cincinnati, Ohio, assignor to General Electric Company, a corporation of New York Filed Oct. 6, 1955, Ser. No. 538,927

3 Claims. (Cl. 253—77)

The present invention relates to a vibration damper for an elastic system and, more particularly, to a structural damper in which the damping force exerted is proportional to the amplitude of displacement of the element being damped.

Up to the present time, mechanical dampers utilized in elastic systems, such as the blading systems of turbo-machinery, to reduce the susceptibility of elements of the system (in this case, the blades) to fatigue failure have generally employed coulomb type damping, wherein energy is dissipated between relative sliding component surfaces acting under the application of constant normal forces which are independent of amplitude, velocity, etc. Such dampers are not completely effective since it is a characteristic of coulomb damping that at the natural frequency of the elastic system being damped, amplitudes of vibration may become indefinitely large over a wide range of ratios of normal forces to driving forces. However, elastic systems damped by forces proportional to the displacement (structural damping) do not have this objectionable characteristic since in the presence of any damping at all of the "structural" type, amplitudes cannot become indefinitely large. The advantages of structural damping have not been obtainable in turbo-machine blading systems to date since the common mechanical devices, such as dash pots and other mechanisms, capable of performing such damping are not suited for use with such systems.

The present invention permits the application of structural damping to turbo-machinery blade systems by provision of means wherein such damping is generated by the relative sliding of surfaces of relatively constant friction coefficient acting under a normal force which is made to vary with the displacement.

An object of the present invention is the provision of means for generating structural damping in elastic systems, such as the blade systems of turbo-machinery.

A further object is to provide a mechanical damper for achieving structural damping without the use of dash pots or other similar mechanisms.

Other objects and many of the attendant advantages of this invention will be readily appreciated as the same becomes better understood by reference to the following detailed description when considered in connection with the accompanying drawings wherein:

Figure 1 is an elevation view partly in section of a pin mounted blade embodying a mechanical damper according to the present invention;

Figure 2 is a view along line 2—2 of Figure 1 showing the inner surface of the blade tang;

Figure 3 is an elevation view partly in section showing the damping spring taken along line 3—3 of Figure 1;

Figure 4 is a sectional view showing the damping spring taken along line 4—4 of Figure 1;

Figure 5 is an elevation view partly in section of another embodiment of the invention used with flexible shank blades;

Figure 6 is a sectional view taken along line 6—6 of Figure 5; and

Figure 7 is a perspective view of a further embodiment of the mechanical damping spring.

Referring more particularly to Figure 1 of the drawings, a pin mounted blade assembly is shown consisting of a blade portion 11, blade tangs 12 and 13, a disc or wheel 14 and a mounting pin 15 pivotally connecting the tangs 12 and 13 to the wheel 14. A sleeve or spacer 16 and a damping spring 17 are mounted on the pin 15 between the wheel and the tang 12. A rib or projection 18, as shown in Figure 2, is provided on the inner surface of the tang 12 and extends toward the wheel 14. The damping spring 17, as illustrated in Figures 3 and 4 is a thin, non-planar, leaf spring having a dished or arcuate profile forming a concavity therein. The rear or convex surface of the spring 17 is provided with a rib or key 19 which is received in a key way 21 in the wheel 14. The spring, oval-shaped in plan view, has lateral extremities 22 and 23 disposed parallel to its longitudinal axis. These symmetrical extremities are bent outwardly in a gentle curve away from the plane of the rib 19, thus defining an arcuate recess or concavity 24 in the front surface of the spring. An opening 25 is formed in the center of the spring to receive the pin 15.

The flexible shank blade assembly of Figures 5 and 6 includes a pair of flexible shank blades 26 and 27 mounted on a disc 28, and front and rear cooling air sealing discs 29 and 31 retained in position on the blades by means of the support pin 32. A thin, flexible, leaf spring 33 is inserted between adjacent blades and retained in position by means of the support pin 32. Spacing of the front and rear cooling discs is maintained by means of a washer or sleeve 32a adapted to fit over the pin 32. In the assembled position, the support pin sleeve bears against the lower surface of the spring along its lateral center line while the opposite extremities 34 and 35 of the spring are bent downwardly towards one another giving the spring an arcuate profile.

The damping spring 36 of Figure 7 is similar to that of Figures 3 and 4 in that a thin, non-planar, leaf spring is provided with a rib or key 37 on its rearward surface which is received in a keyway 38 in a wheel or disc 39. In this embodiment the central portion of the spring is formed with a recess 40 having a nearly semicircular cross section. Disposed on either side of the recess 40, and extending generally parallel to the longitudinal axis of the spring 36, are a pair of lateral extremities 41 and 42. These extremities are sharply bent at their junction with the recess so that they will lie flat against the blade tang when in an assembled relationship therewith.

In the operation of the embodiment of the invention shown in Figures 1 to 4, the damping spring 17 is seated upon the disc 14 and prevented from rotating with respect to the disc by means of the key 19 received in the keyway 21. Since the blade is connected to the disc by means of the pin 15 only, it is free to rotate with respect to the disc about the pin as an axis of rotation. In the neutral position of the blade, the rib 18 on the inner surface of the blade tang 12 lies substantially within the recess 24 in the damping spring parallel to the key 19. Since the rib 18 is substantially enclosed by the recess 24 of the spring, when the blade rotates, in either direction, the opposite ends of the rib will contact diagonally opposite portions of the recess walls, thus tending to twist and flatten the dished damping spring. The force between the spring and the rib is a function of the angular displacement of the blade since the distance through which the spring is compressed (and the force resisting such compression) is increased correspondingly with increased rotation of the blade. In this embodiment, the dished portions of the spring diverge from the plane of the key 19 at a relatively small angle, such that the normal force exerted between the spring and the rib 18 varies linearly with the displacement of the blade. As illustrated, the damper spring exerts no force against the rib 18 in the neutral position. However, the spring may be designed such that some residual force exists in the neutral position so that some small damping appropriate to higher mode vibration always exists while more pronounced energy dissipation is possible for the lower modes in which relatively larger displacements are to be expected.

In the operation of the damper for flexible shank mounted blades, shown in Figures 5 and 6, the damper spring 33 presses against the curved shank surface with a predetermined pressure which increases a predictable amount as a function of rotor speed. The support pin 32, prevented from rotating relative to the sealing discs by its seating therein, permits damping to take place for each blade independent of its neighbor. The damper spring 33 is compressed when the blades 26 or 27 flex or rotate toward each other and the amount of compression varies with the degree of rotation of the blades. Therefore, the normal forces between the spring and the shank of either blade depends upon the displacement of the blade. It should be noted that in this embodiment dissipation of energy depends on the displacement of each blade relative to the sealing discs and is not confined to the relative displacement of each blade relative to its neighbor.

The operation of the embodiment of Figure 7 is similar to that of the embodiment of Figures 1 to 4 except the normal force between the spring and the blade varies non-linearly or even discontinuously with the amplitude of displacement of the blade. At its upper limit, the discontinuous spring restraint approaches impact damping in its influence upon the blade's dynamic response. In this type of amplitude limitation, the energy applied to the elastic system in one predominant frequency can be distributed among several of a continuous systems natural frequencies, no one of which would be as severe in its response as the one which would be set up without the non-linear spring.

The present invention is capable of wide application to elastic systems since proper modification of damper geometry will permit a variation of damping with practically any power of the displacement from the linear schedule to the discontinuous which approximates impact damping.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed is:

1. A mechanical vibration dampener for applying structural damping to an elastic system comprising: a thin non-planar spring having lateral extremities forming a concavity therebetween, said extremities being in contact with a movable element of said system, said element being movable with respect to said spring and slidable thereon, said movable element having projecting means on its surface adapted to be received in said concavity, said spring being rigidly mounted on a relatively non-movable element of said system to exert a resisting force against said movable element, as the movable element projecting means turns relative to said spring, the spring being shaped so that the intensity of the resisting force varies with the amount of displacement of the movable element.

2. In a turbo-machine including a disc and at least one blade pivotally mounted thereon by tangs radially overlapping said disc, a structural vibration dampener comprising: a thin non-planar spring rigidly mounted on said disc and extending between the disc and one of the tangs, the lateral extremities of the spring extending away from its center and bearing on said one tang; and a projection on the surface of said one tang nearest the disc, said projection being in an axial overlapping relationship with said spring and adapted to flex the spring when the blade is pivoted.

3. For use in an elastic system including at least two members, one of which is moveable relative to the other, a vibration dampener mechanism in which the magnitude of the damping force is proportional to the amplitude of displacement of the moveable member comprising, a bent spring having non-planar surfaces forming a concavity the spring being positioned between said members and in contact therewith, said spring having its lateral extremities displaced from the center of the spring at least at two diametrically opposite points removed from said center, said surfaces inclining in a non-planar direction on each side of said center outwardly to said points, and a projecting surface on one of said members, said projecting surface being in an overlapping relationship with said non-planar concave surface and adapted to flex said spring under displacement of said one member relative to the other.

References Cited in the file of this patent

UNITED STATES PATENTS

| | | |
|---|---|---|
| 1,189,943 | Hartford | July 4, 1916 |
| 1,271,362 | Rainey | July 2, 1918 |
| 1,940,449 | Dodge | Dec. 19, 1933 |
| 2,092,571 | Cole | Sept. 7, 1937 |
| 2,669,130 | Shell | Feb. 16, 1954 |

FOREIGN PATENTS

| | | |
|---|---|---|
| 989,556 | France | May 3, 1951 |